Sept. 10, 1940. H. O. RASTETTER ET AL 2,214,382
ALIGNING COUPLING
Filed June 9, 1938 2 Sheets-Sheet 1

Inventors
Harry O. Rastetter
and George D. Rausch
By Frease and Bishop
Attorneys

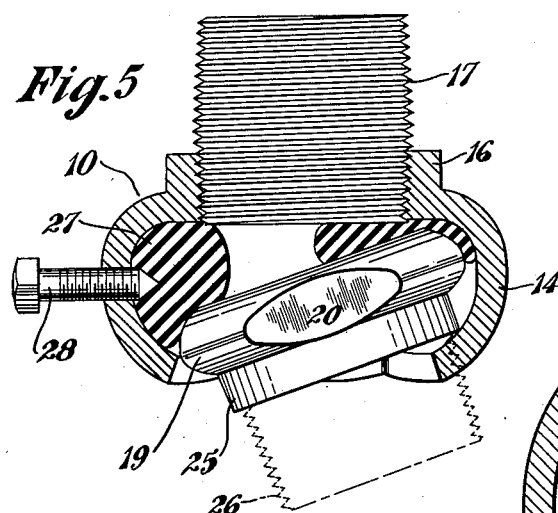
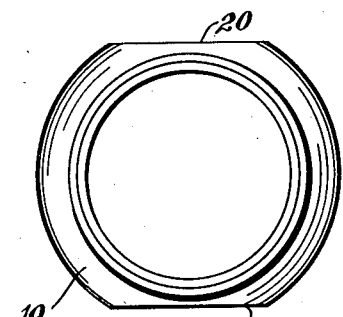
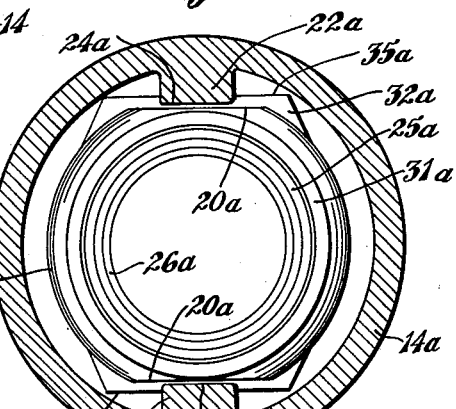
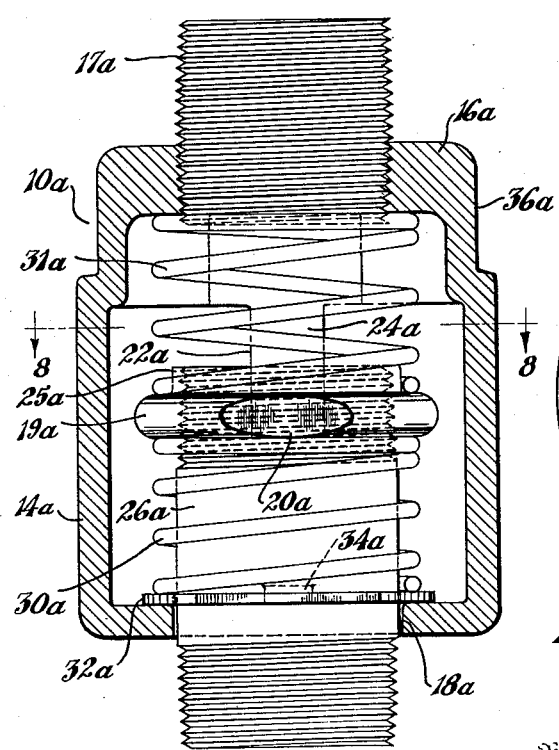
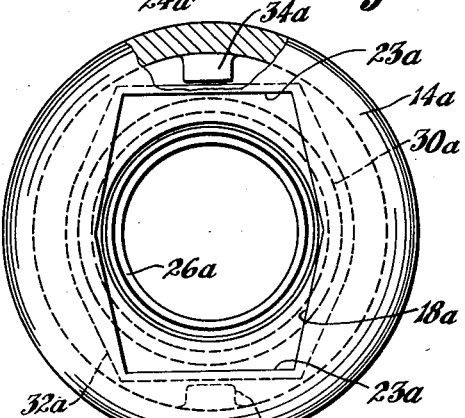

Patented Sept. 10, 1940

2,214,382

UNITED STATES PATENT OFFICE 2,214,382

ALIGNING COUPLING

Harry O. Rastetter, Canton, and George D. Rausch, Hartville, Ohio, assignors to The Union Metal Manufacturing Company, Canton, Ohio, a corporation of Ohio Application June 9, 1938, Serial No. 212,762

6 Claims. (Cl. 287—85)

The invention relates generally to couplings, and more particularly to a coupling for connecting an electrical fixture to a bracket arm extending laterally from a support.

In many outdoor lighting standard installations the lighting fixture hangs from the outer end portion of the bracket arm, and it is highly desirable to provide a coupling between the arm and the lighting fixture which will facilitate erection and installation of the lateral arm and fixture, and at the same time provide a separable connection therebetween which is substantially moisture proof and insect proof.

In practically all such installations the lighting fixture is required to hang plumb or vertically regardless of bends or inaccuracies in the alignment of the bracket arm, and accordingly the lighting fixture should be connected to the arm in such a way as to permit some lateral movement of the lighting fixture with respect to the arm, so that the lighing fixture will always hang plum or vertically downward from the bracket arm.

Moreover, where electrical fixtures are located on roadways subjected to shocks and vibrations resulting from heavy traffic, the coupling means connecting the fixtures to the supporting bracket arms should be adapted to cushion shocks or vibrations transmitted through the supporting arm, so as to substantially preclude injury to delicate elements such as the lamp filaments.

An important object of the present invention is to provide an improved coupling with facilitates mounting an electrical fixture on a bracket arm after the bracket arm is mounted in place.

Another object is to provide a coupling having parts which are easily assembled and taken apart when not connected to the electrical fixture, but which cannot be taken apart when connected to said fixture.

A further object is to provide an improved coupling for connecting a lighting fixture to a bracket arm, which coupling is substantially moisture proof and insect proof.

Another object is to provide an improved coupling for adjustably connecting an electrical fixture to a bracket arm so as to permit plumbing or vertically aligning said fixture.

A still further object is to provide a coupling for substantially preventing shocks and vibrations from being transmitted to the fixture from the bracket arm supporting the same.

And finally, it is an object of the present invention to provide a novel and useful coupling of simple and inexpensive construction, and which attains the foregoing desiderata.

These and other objects are attained by the improved coupling construction comprising the present invention, which may be stated in general terms as including a closed or annularly continuous housing adapted to be rigidly connected to a bracket arm, a nut member movably mounted in said housing and adapted for connection with the electrical fixture to permit limited swinging or oscillatable movement of said fixture relative to said housing, said housing having a bottom opening adapted to permit insertion and removal of said nut member therethrough by tilting said nut member when it is not connected with the fixture.

Referring to the drawings herein in which preferred embodiments of the invention are illustrated by way of example;

Fig. 5 is a view similar to Fig. 3 showing the nut member tilted for inserting and removing the same;

Fig. 6 is a detached bottom plan view of the nut member shown in section in Figs. 2 and 3 and in elevation in Fig. 5;

Fig. 7 is a longitudinal sectional view of a modified form of the improved coupling adapted for absorbing shocks and vibrations;

Fig. 8 is a transverse sectional view thereof substantially on line 8—8, Fig. 7, and Fig. 9 is a bottom plan view partly in section, of the coupling shown in Fig. 7.

Similar numerals refer to similar parts throughout the drawings.

Figure 2:
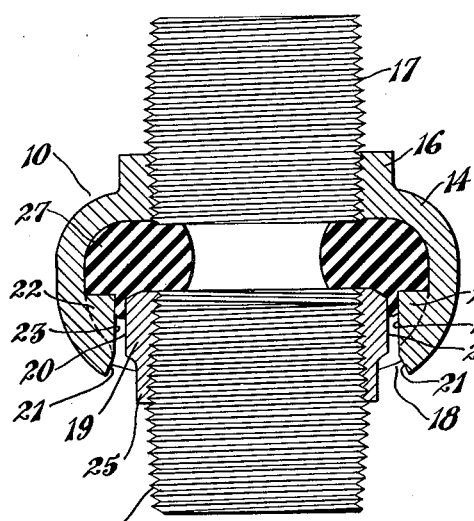
Fig. 2 is an enlarged longitudinal sectional view through the coupling shown in Fig. 1.

The embodiments shown in the drawings are preferred exemplary forms of the invention, but the details of construction may be modified, as well as the application or use of the same, without departing from the scope of the invention as defined in the appended claims.

Figure 1:
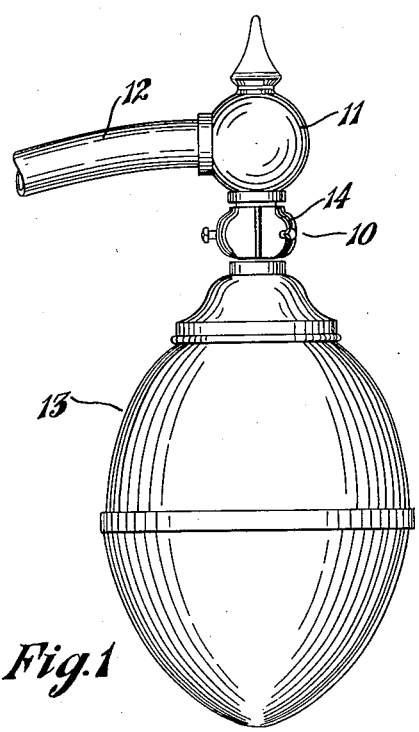
Figure 1 is a fragmentary elevational view showing a preferred form of the improved coupling connecting the outer end of a bracket arm to a lighting fixture.

Referring first to Figs. 1 to 6 inclusive, a preferred form of the improved coupling is indicated generally at 10, and is shown in Fig. 1 as constituting the connecting means between the outer end fitting 11 of a bracket arm 12 and a lighting fixture 13 hanging or depending therefrom. The bracket arm 12 is suitably supported at its inner end on a lighting standard or other support (not shown), and obviously the bracket arm may have any desired size or shape without affecting the scope of the present invention.

The coupling 10 preferably embodies a closed or annularly continuous housing or casing 14, which may have an outwardly bulged shape, and a series of exterior ribs 15 for aiding in gripping the housing when assembling the coupling. The top end 16 of said housing 14 is preferably tubular and interiorly threaded, for having one end of a threaded pipe nipple 17 screwed therein, the other end of said nipple 17 being adapted for screwing into the fitting 11 on the end of the bracket arm 12, for rigidly securing the housing 14 to said arm. The housing 14 may be rigidly secured to the bracket arm in various other ways, or may be integral therewith, as desired.

Figure 4:
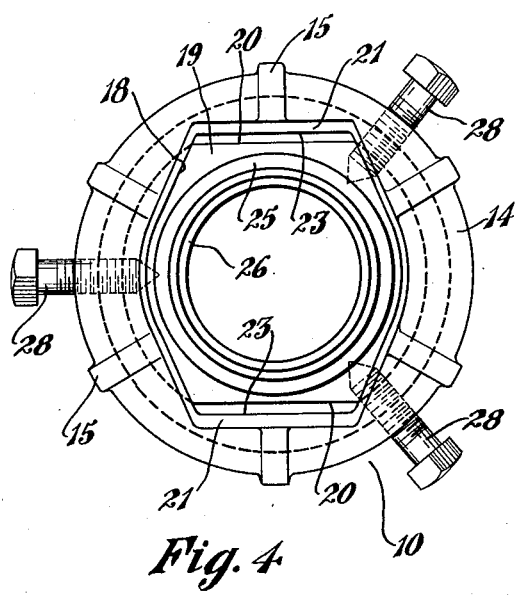
Fig. 4 is a plan view looking at the bottom of the coupling as shown in Fig. 3.

The bottom end of the housing 14 is provided with an enlarged opening 18 which is preferably generally polygonal in outline, as shown in Fig. 4, for a purpose to be described.

Figure 3:
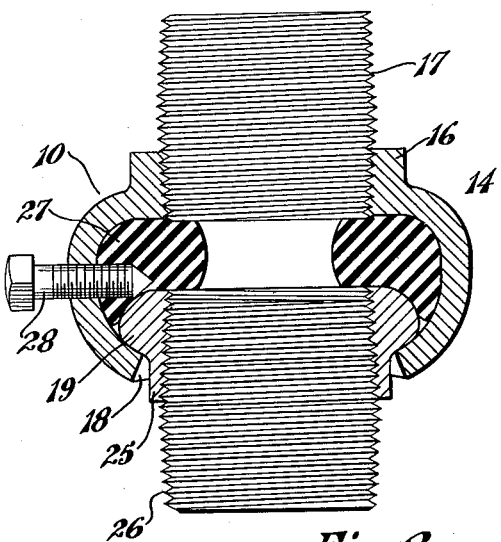
Fig. 3 is a similar view taken at 90° to the plane of Fig. 2.

A nut member 19 (Fig. 6) having a preferably substantially circular or annular shape and a rounded rim portion substantially hemispherical in cross section is adapted to be positioned in the housing in a substantially flat or horizontal position as shown in Figs. 2 and 3. The rounded rim portion of the nut member is provided with oppositely located flat outer surfaces 20, and the size and shape of the nut member is such that it may be inserted upwardly through the bottom opening 18 of housing 14 by tilting the nut member in a manner indicated in Fig. 5. In inserting said nut member 19 through said opening, it is tilted with its outer flat surfaces 20 positioned at or adjacent to the straight side walls 21 of the opening 18.

The housing 14 is provided interiorly with oppositely located boss portions 22 preferably located above the straight side walls 21 of the opening and having flat surfaces 23 arranged to be immediately adjacent the flat surfaces 20 of the nut member 19, after the same is inserted in the housing, said surfaces 20 and 23 providing interengageable means for preventing rotation of the nut member relative to the housing.

As best shown in Fig. 3, the interior surface of the housing is rounded or substantially spherical at its lower end, and the housing walls adjacent the opening 18 engage under the rounded rim of the nut member 19 for oscillatably supporting said nut member. The nut member is preferably provided with a depending tubular flange portion 25 which is adapted to engage the walls of opening 18 when the nut is oscillated on the housing, for limiting said oscillating movement.

The nut member is interiorly threaded for having screwed therein one end of a tubular connector 26, which may be a pipe nipple as shown, and said connector 26 projects through and is spaced from the walls of opening 18, and is adapted to be connected to the lighting fixture 13 at its lower end. As shown in Fig. 5, insertion or removal of the nut member 19 into or from housing 14 requires tilting the nut member to such an extent that when the connector 26 is screwed in the nut member it prevents tilting the nut member to an extent necessary for removing the same, because the connector will engage the walls of the opening 18 before the nut is sufficiently tilted.

Thus when the coupling is assembled it cannot come apart as long as the connector 26 is screwed into the nut, which would cause a lighting fixture connected thereto to be accidentally disconnected from the bracket arm.

The annularly continuous housing 14 provides a housing closed from the top side of the coupling so as to make it substantially moisture proof from above, and sealing means is provided to make it moisture proof from below, as well as to render the coupling insect proof. The sealing means may be in the form of an annular gasket indicated at 27 which is preferably of soft or sponge rubber and located between the inner surface of the housing and the top of the nut member 19.

Means for adjusting the nut member 19 to different oscillated positions and for maintaining it in any desired adjusted position may include a plurality of set screws 28 screwed through the housing 14 at intervals around its periphery. The tapered inner ends of set screws 28 are arranged to engage the upper part of the rounded rim portion of the nut member 19, as shown in Fig. 3. Thus by manipulating the screws 28 the nut member 19 may be oscillated on the lower interior surface of the housing and maintained in any desired oscillated position so as to adjust and maintain the lighting fixture 13 in a plumb or vertical position.

The improved coupling may be assembled by first screwing the nipple 17 into the top end 16 of housing 14. The set screws 28 being preferably adjusted so as not to project into the interior of the housing any substantial distance, the rubber sealing gasket may then be inserted through the bottom opening 18 of the housing. The nut member 19 is then inserted through said opening 18 by tilting said nut member in the manner previously set forth, the gasket 17 being easily compressed and distorted as shown in Fig. 5 sufficiently to permit the insertion of the nut member in tilted position, and the nipple or connector 26 is then entered through opening 18 and screwed into the nut 19.

In mounting an electrical fixture on a bracket arm using the improved coupling, after the bracket is mounted in place on its support with the necessary electric conductors extending through the arm, the conductors are passed through the coupling and the housing 14 of the coupling 10 is attached to the arm, as by screwing the nipple 17 into end fitting 11.

The fixture 13 is then connected to the nipple 26, and after the conductors are properly connected in said fixture it may then be adjusted in place on the arm so as to cause it to hang plum or vertically downward, by manipulating set screws 28, regardless of bends or inaccuracies in alignment of the bracket arm 12 and its end fitting 11.

The modified form of improved coupling illustrated in Figs. 7, 8 and 9 is particularly adapted for use in mounting lighting fixtures or other electrical equipment on bracket arms where the bracket arms are attached to supports subjected to shocks or vibrations, as in the case of standards or poles located on bridges and viaducts which are subjected to heavy traffic. Under such conditions the shocks or vibrations are transmitted through the bracket arm to the fixture, and any fragile or delicate elements in the fixture, such as the filaments in light bulbs, may be damaged or destroyed thereby.

The coupling indicated generally at 10a in Figs. 7, 8 and 9 provides means for absorbing shocks and vibrations transmitted from the bracket arm, so that they are substantially prevented from reaching the fixture connected to the bottom end of the coupling.

The coupling 10a preferably embodies a closed or annularly continuous housing 14a, and the top end 16a of the housing is preferably tubular and interiorly threaded for receiving one end of a threaded pipe nipple 17a. The other end of the nipple 17a is adapted to be screwed into a suitable fitting on the end of a bracket arm supported on a pole or standard, or other support.

The bottom end of the housing 14a is provided with a substantially polygonal opening 18a preferably including two straight parallel side walls 23a. A nut member 19a is adapted to be positioned inside the housing in a substantially flat position, and is preferably provided with a rounded rim portion having oppositely located flat surfaces 20a. The size and shape of the nut member 19a is such that it may be inserted through the bottom opening 18a of the housing by tilting the nut member similarly to the manner of tilting the nut member 19 for insertion into housing 14.

The housing 14a is provided interiorly with oppositely located boss portions or lugs 22a having inner flat surfaces 24a, and the boss portions 22a are spaced from the ends of the housing 14a so as to be positioned immediately adjacent the flat surfaces 20a on the nut when the nut is positioned substantially midway between the ends of the housing, as shown in Fig. 7.

Means yieldingly supporting the nut member within the housing may include a helical spring 30a interposed between the nut member 19a and the bottom end of the housing and a similar spring 31a interposed between the nut member and the top of the housing. Preferably, the nut member is provided with an annular flange 25a which extends upwardly to act as a centering boss for the spring 31a.

The nut member 19a is interiorly threaded for receiving the upper threaded end of a tubular connector 26a, the lower end of which is threaded for connection with a lighting fixture or other electrical fixture. The connector 26a may be a pipe nipple as shown and extends loosely through the opening 18a in the housing, so that some lateral movement of the connector and the fixture connected thereto is permitted relative to the housing.

Sealing means for rendering the coupling substantially insect proof preferably includes a flat metal washer 32a having a shape somewhat similar to the outline of opening 18a, but being sufficiently larger to overlap and close said opening when the washer is positioned abutting the inside of the bottom wall of the housing as shown in the drawings. The washer 32a also functions to support spring 30a and retain it in the housing.

In assembling the improved coupling 10a, the nipple 17a is screwed into housing 14a and the spring 31a may be inserted through opening 18a by rotating or screwing the same therethrough, after which the nut member 19a is inserted by tilting the same, and the spring 30a is then inserted to support the nut member in position. The sealing washer 32a may then be inserted through opening 18a by tilting the same substantially around an imaginary line between diagonally opposite corners of the opening, in a manner similar to the method of inserting the nut member 19a.

The tubular connector 26a is then inserted axially through the opening 18a, washer 32a and spring 30a, and the upper end of said connector is screwed into the nut member. The adjacent flat surfaces 20a and 24a of the nut member and housing respectively, provide interengageable means for preventing rotation of the nut when the tubular connector is screwed therein.

The assembled coupling may then be attached to a bracket arm and an electrical fixture connected to or hung from the tubular connector 26a; and the loose fit of the connector in the opening 18a permits sufficient lateral or oscillating movement of the fixture to allow it to plumb itself for hanging vertically downward.

Preferably the interior of the housing 14a is provided with oppositely located lugs 34a adjacent the opening 18a for cooperating with flat surfaces 35a on the washer 32a to prevent the same from turning after it is in position. The upper end portion 16a of the housing 14a may have a polygonal exterior surface indicated at 36a for aiding in gripping the housing when the nipples 17a and 26a are connected therein.

The modified form of coupling 10a provides means for absorbing shocks and vibrations transmitted from the bracket arm, because the nut member is floatably supported within the housing by means of the springs 30a and 31a, so that said shocks and vibrations are substantially prevented from being transmitted to the fixture connected to connector 26a, thereby protecting any fragile or delicate elements in the fixture, such as light bulb filaments.

We claim:

1. Coupling construction for connecting an electrical fixture to a bracket arm including a closed housing member adapted at its top end to be rigidly secured to said bracket arm and having walls forming a bottom opening therein, a nut member insertable by tilting through said opening, means movably supporting said nut member in said housing member, a tubular connector detachably secured in said nut member for supporting a lighting fixture vertically from said coupling, and sealing means between the nut and the interior of the housing member, said tubular connector projecting through said opening and being spaced from the walls thereof for limiting the tilting movement of said nut member to prevent its removal through said opening when the nut member is secured to the tubular connector.

2. Coupling construction for connecting an electrical fixture to a bracket arm including an annularly continuous housing adapted at its top end to be secured to said bracket arm and having an opening in its bottom end, a nut member insertable through said opening, means on the housing oscillatably supporting said nut member therein, and means for adjusting said nut member to oscillated positions, and a fixture connector member screwed into said nut and projecting through said bottom opening, said connector member being adapted to engage the walls of the opening when the nut member is oscillated for preventing removal of the nut member therethrough.

3. Coupling construction for connecting an electrical fixture to a bracket arm including an annularly continuous housing adapted to be secured to said bracket arm and having walls forming an opening in its bottom end, a nut member passable through said opening when the nut member is tilted with respect to said opening, means on the housing oscillatably supporting said nut member therein, means for adjusting said nut member to oscillated positions, and resilient sealing means between the nut member and the housing at the upper end of said nut member.

4. Coupling construction for connecting an electrical fixture to a bracket arm including an annularly continuous housing having an opening in its top end adapted to be secured to said bracket arm and having an opening in its bottom end, a nut passable through said bottom opening when tilted with respect to said opening, means on the housing oscillatably supporting said nut member therein, interengageable surfaces on the nut member and the housing for preventing relative rotation of the nut member, and means for adjusting said nut member to oscillated positions.

5. Coupling construction for connecting an electrical fixture to a bracket arm including an annularly continuous housing adapted to be secured to said bracket arm and having an opening in its bottom end, a nut passable through said opening when tilted with respect to said opening, means on the housing oscillatably supporting said nut member therein, interengageable surfaces on the nut member and the housing for preventing relative rotation of the nut member, and means for adjusting said nut member to oscillated positions, a fixture connector member screwed into said nut member and projecting through the bottom opening in said housing, the connector member being spaced from the walls of said opening for engaging said walls on limited oscillating movement of said nut.

6. Coupling construction for connecting an electrical fixture to a bracket arm including a closed housing member adapted at one end to be rigidly secured to said bracket arm and having an opening in its other end, a nut member insertable by tilting through said opening, means yieldingly supporting said nut member in said housing, and a fixture connector member screwed into the nut member and movably projecting through said bottom opening.

HARRY O. RASTETTER.
GEORGE D. RAUSCH.